US010013630B1

(12) United States Patent
Brendel

(10) Patent No.: US 10,013,630 B1
(45) Date of Patent: Jul. 3, 2018

(54) DETECTION AND RECOGNITION OF OBJECTS LACKING TEXTURES

(71) Applicant: A9.com, Inc., Palo Alto, CA (US)

(72) Inventor: William Brendel, San Francisco, CA (US)

(73) Assignee: A9.com, Inc., Palo Alto, CA (US)

( * ) Notice: Subject to any disclaimer, the term of this patent is extended or adjusted under 35 U.S.C. 154(b) by 219 days.

(21) Appl. No.: 14/498,924

(22) Filed: Sep. 26, 2014

(51) Int. Cl.
G06K 9/48 (2006.01)
G06F 17/30 (2006.01)
G06K 9/32 (2006.01)
G06K 9/46 (2006.01)
G06T 7/00 (2017.01)

(52) U.S. Cl.
CPC ....... G06K 9/481 (2013.01); G06F 17/30256 (2013.01); G06K 9/3241 (2013.01); G06K 9/4642 (2013.01); G06T 7/0085 (2013.01); G06T 2207/10004 (2013.01); G06T 2207/20116 (2013.01)

(58) Field of Classification Search
CPC .... G06K 9/481; G06K 9/3241; G06K 9/4642; G06F 17/30256; G06T 7/0085; G06T 2207/20116; G06T 2207/10004
See application file for complete search history.

(56) References Cited

U.S. PATENT DOCUMENTS

2010/0111370 A1* 5/2010 Black .................. G06K 9/00369
382/111
2011/0123120 A1* 5/2011 Quack ............... G06F 17/30256
382/197
2013/0245426 A1* 9/2013 Lee ......................... A61B 6/502
600/411
2014/0095549 A1* 4/2014 Shi .................... G06F 17/30292
707/803
2014/0198852 A1* 7/2014 Incesu .............. H04N 19/00684
375/240.16

FOREIGN PATENT DOCUMENTS

CN 201210290338 * 8/2012

OTHER PUBLICATIONS

Foreign Translation CN201210290338.*
Shotton, Jamie, Andrew Blake, and Roberto Cipolla. "Contour-based learning for object detection." Computer Vision, 2005. ICCV 2005. Tenth IEEE International Conference on. vol. 1. IEEE, 2005.).*

* cited by examiner

Primary Examiner — Bhavesh Mehta
Assistant Examiner — Menatoallah Youssef
(74) Attorney, Agent, or Firm — Hogan Lovells US LLP

(57) ABSTRACT

Various embodiments provide methods and systems for detecting one or more segments of an image that are related to a particular object in the image (e.g., a logo or trademark) and extracting at least one feature point, each of which is represented by one feature point descriptor, based at least upon a contour curvature of the one or more segments. The at least one feature point descriptor can be converted into one or more codewords to generate a codeword database. A discriminative codebook can then be generated based upon the codeword database and utilized to detect objects and/or features in a query image.

20 Claims, 11 Drawing Sheets

DETECTION AND RECOGNITION OF OBJECTS LACKING TEXTURES

BACKGROUND

With the increased use of digital images, affordability of portable computing devices, availability of increased capacity of digital storage media, and increased bandwidth and accessibility of network connections, digital images have become a part of life for an increasing number of people. Users with a range of interests from various locations can capture digital images of various subjects and make captured images available to others via networks, for example the Internet. To further enhance users' experiences in viewing captured digital images, virtual search technologies have been used in various applications.

However, it remains a challenge to enable computing devices to identify various objects and/or features captured in a wide range of changing conditions (e.g., changes in image scales, noises, lighting, movement, or geometric distortion). Conventional image detection and recognition techniques can only detect and identify images with textured objects or features. Therefore, there is a need for systems and methods to efficiently detect and recognize texture-less objects and/or features in digital images.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome deficiencies in conventional approaches in virtual searches of digital images. In particular, various embodiments enable detecting one or more segments of an image that are related to at least one object in the image (e.g., a logo or trademark) and extracting at least one feature point, each of which is represented by one of at least one feature point descriptor, based at least upon a contour curvature of the one or more segments. The at least one feature point descriptor can be converted into one or more codewords to generate a codeword database. A discriminative codebook can then be generated based upon the codeword database and utilized to detect objects and/or features in a query image.

In some embodiments, in response to receiving a query image, at least one feature point can be extracted from the query image. Each feature point can be represented by at least one feature point descriptor. Various feature detection techniques can be used to identify the feature points from the query image. The feature detection techniques may include, but are not limited to, maximally stable extremal regions (MSER), image moment, scale-invariant feature transform (SIFT), support vector machine (SVM), Adaboost, and Pyramid match kernel (PMK), Hessian-Affine, Harris-Affine, edge-based region (EBR), or scale-invariant shape features (SISF) etc.

The at least one feature point descriptor can be converted into one or more codewords. A frequency histogram of codewords can be generated by comparing the one or more codewords with a discriminative codebook and used to infer the one or more potential objects in the query image.

At least some embodiments verify one or more potential objects in a query image by using a set of matching pairs between the query image and a retrieved image from a codeword database. In some implementations, the set of matching pairs can be refined by using Random Sample Consensus (RANSAC).

Figure 1A:
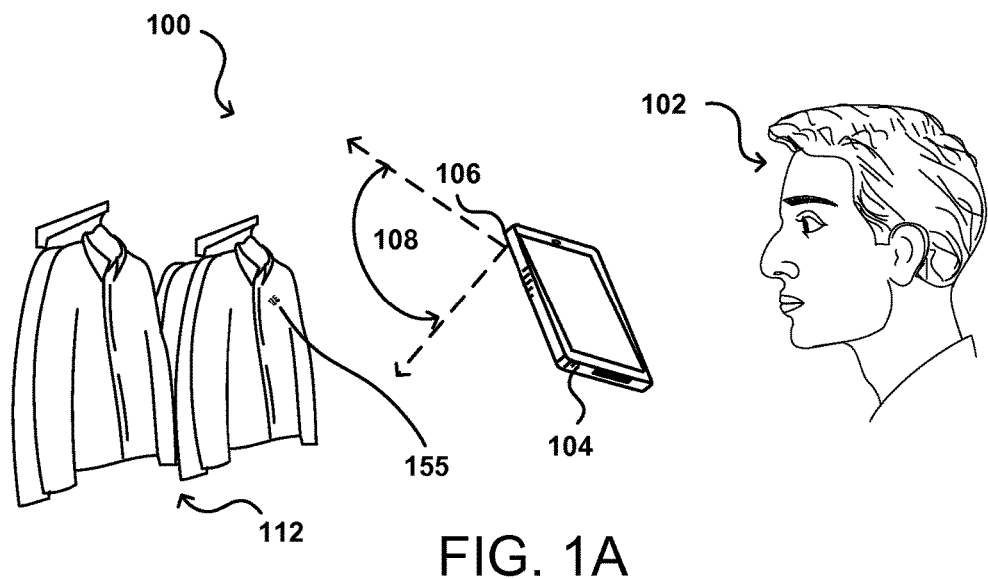
FIGS. 1A and 1B illustrate an example process in which a user attempts to capture an image with a logo lacking textures and cause a computing device to detect and recognize the logo in accordance with various embodiments.

FIG. 1A illustrate an example situation 100 in which a user is attempting to capture an image with a logo lacking textures in accordance with various embodiments. Although only a portable device is shown in FIG. 1A, it should be understood that various types of electronic or computing device that capable of capturing, receiving and/or processing images in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device 104 may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. The computing device 104 may have at least one camera 106. Each camera may be, for example, a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies.

In this example, the user can position the computing device 104 such that one or more objects of interests 112 are within a field of view 108 of at least one camera 106 of the computing device 104. The at least one camera 106 can capture a still image 154, such that a representation of the object(s) of interest 112 with a logo 155 such as the depicted trademarked logo of the Columbia Sportswear Company®) displayed on a display screen 152 of the computing device 104, as illustrated in the example situation 150 of FIG. 1B. In other embodiments, the camera capture video, such that a "live" view of the captured video information. In at least some embodiments, the image and/or a frame of the video can be analyzed, such as by analyzing on the device or uploading across a network to a service for analyzing image content.

Figure 1B:
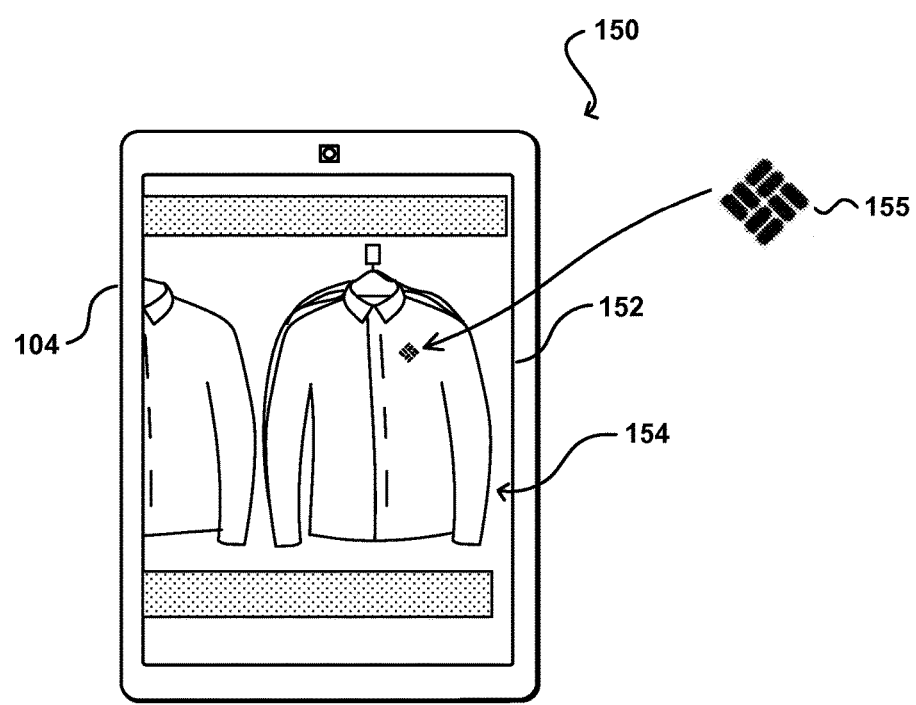

However, recognizing objects or features lacking textures (i.e., the surface of the objects or features is characterized by poor informative content), based on a mobile query image such as that illustrated in FIG. 1B can be difficult and extremely resource intensive. For example, in the example image 154 there is a logo 155 presented in the image. Although conventional image detection and recognition algorithms are good at detecting texts and texture-rich features, it can be significantly more difficult for a computer vision (or other such) algorithm to analyze the image, detect and recognize objects or features (e.g., the logo 155) that lack textures.

Accordingly, approaches in accordance with the various embodiments cause an image to be captured that includes a representation of an object or feature in an identified region or portion of the image. The object or feature may or may not have textures. Various approaches enable the object or feature to be analyzed on the computing device 104, a recognition server, or a suitable device. Some embodiments may generate a discriminative codebook to detect and recognize objects or features lacking textures.

Figure 2A:
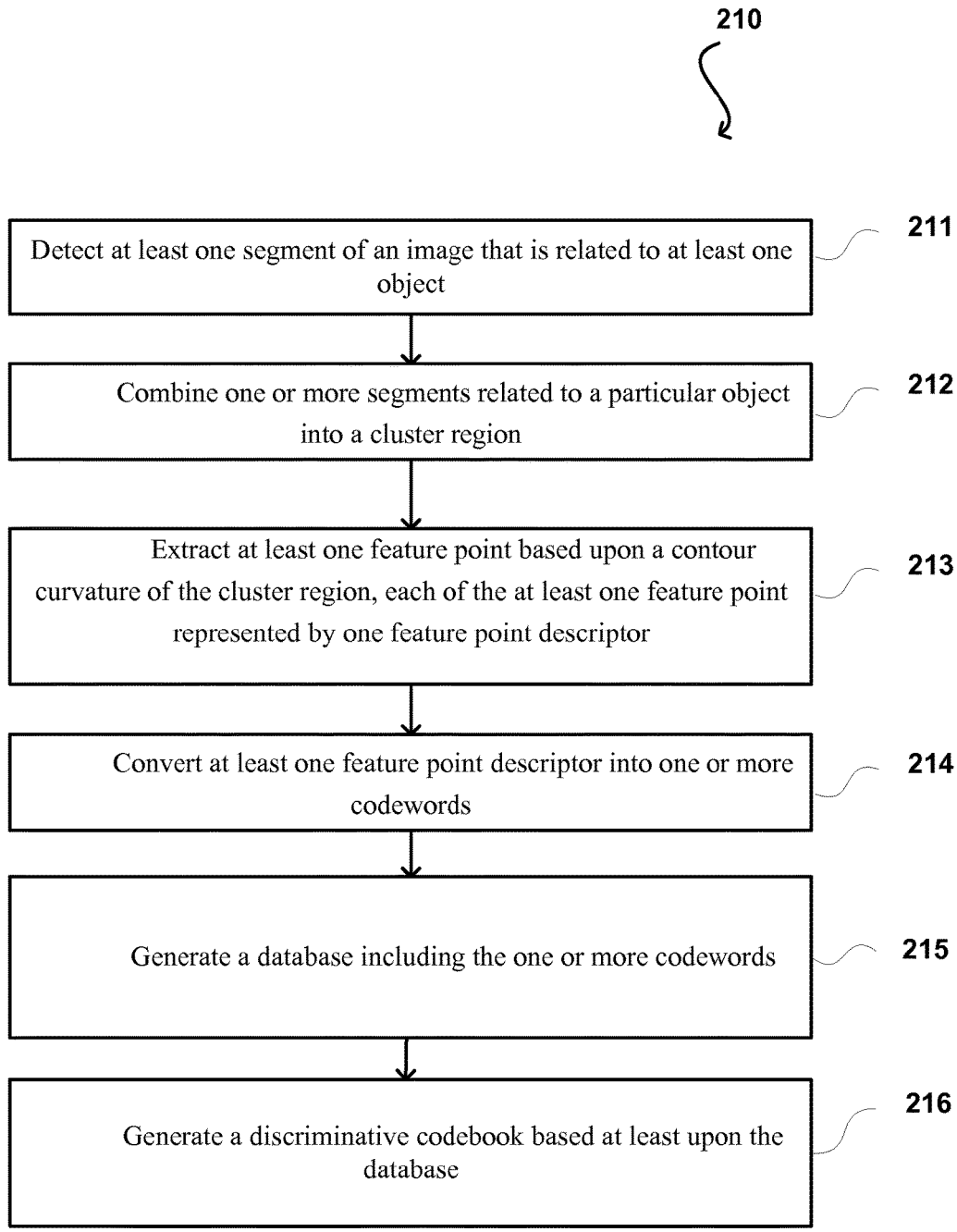
FIG. 2A illustrates an example process for generating a discriminative codebook in accordance with various embodiments.

FIG. 2A illustrates an example process 210 for generating a discriminative codebook in accordance with various embodiments. It should be understood that there can be additional, fewer, or alternative steps performed in similar or alternative orders, or in parallel, within the scope of the various embodiments unless otherwise stated. The example method embodiment 210 starts with detecting at least one segment of an image that is related to at least one object, at step 211. Many embodiments provide imaging processing algorithms and recognition techniques to detect the one or more segments of the image. In some implementations, maximally stable extremal regions (MSER) techniques can be used to detect one or more segments related to at least one object of an image.

In some cases, a particular object of the image may have disconnected components. One or more segments related to the particular object may be combined into a cluster region, at step 212. In some embodiments, only segments within a predetermined distance (e.g., a number of pixels) can be grouped together into a cluster region. In some implementations, the predetermined distance can be normalized based upon a size of the image.

At least one feature point can be extracted based at least upon a contour curvature of the cluster region of the image, at step 213. In some embodiments, a center of the mass of a contour curvature can be determined by averaging locations of all points on the contour curvature. A signature of each point on the contour can be calculated according to a distance between the corresponding point to the center of the mass of the contour curvature. In some embodiments, each feature point is an extreme of a signature of points on the contour, which are extremes of distances between points on the contour curvature and the center of the mass of the contour curvature. The feature extraction process can be invariant to geometric transformations and changes in illuminations. In some embodiments, a max number of feature points can be set for feature points that are close in range. Those maxed out feature points may be excluded from representing a shape of a contour curvature and rendered "invisible" in later processes and not contributing to any histogram.

In some embodiments, each of at least one feature point on a contour curvature can be represented by a Log-polar sharping context descriptor. In some embodiments, each of at least one feature point on a contour curvature can be represented by a gray-scale window, a vector of filter outputs, or brightness at a single pixel.

In some embodiments, two or more different object detection processes can be run in parallel to detect objects with textures and objects lack of textures, respectively. Some well-established imaging processing algorithms and recognition techniques may be used to detect textured objects of the image. For examples, optical character recognition (OCR) can be used as a primary image analysis technique or to enhance other processes. Features (e.g., shape, size, color and text) of the image can be extracted. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various techniques can be used as the primary image analysis technique or to enhance other processes. Some techniques are described in co-pending U.S. patent application Ser. No. 14/094,655, filed Dec. 2, 2013, entitled "Visual Search in a Controlled Shopping Environment," which are hereby incorporated herein by references in their entirety.

At step 214, the at least one feature point descriptor can be converted into one or more codewords. At step 215, a codeword database that includes the one or more codewords can be generated. In some embodiments, the codeword database further includes codewords that represent different appearances of the at least one object that are generated by using random perspective transformations. The codewords that represent different appearances of the at least one object can be computed based at least upon the at least one feature point, the at least one feature point descriptor, or coordinates of the at least one feature point. In some embodiments, each codeword stored in a database can be assigned with a particular weight that is computed according to uniqueness of the corresponding codeword comparing with other codewords in the database.

In some embodiments, a bag-of-words model (BoW model) may be used to classify the at least one feature point of the image into a plurality of codewords. In some implementations, a bag of visual words can be a vector of occurrence counts of a vocabulary of the at least one feature point of the image. The vector of occurrence counts may be feature descriptors of the image, which are capable of handling variations of intensity, rotation, scale and/or affine of the at least one feature of the image. In some embodiments, the vector of occurrence counts are Scale-invariant feature transform (SIFT) descriptors. SIFT can convert each of the at least one feature of the image to a 128-dimensional vector. The image can be represented by a plurality of vectors with the same dimension (i.e., 128).

At step 216, a discriminative codebook can be generated based at least upon the codeword database. In some embodiments, the discriminative codebook is represented by a forest of tree, leaves of which may represent a plurality of codeword bins.

In some embodiments, a BoW model can be used to convert the at least one feature of the image and variants of the image into a discriminative codebook that includes a plurality of codewords. Each codeword represents one feature and variants of the feature of the image, and thus can be defined as a center of variants of the feature. The number of distinct codewords can be the size of the discriminative codebook. Thus, each feature of the image can be mapped to a particular codeword in the discriminative codebook while the image can be represented by a histogram of the codewords.

Figure 2B:
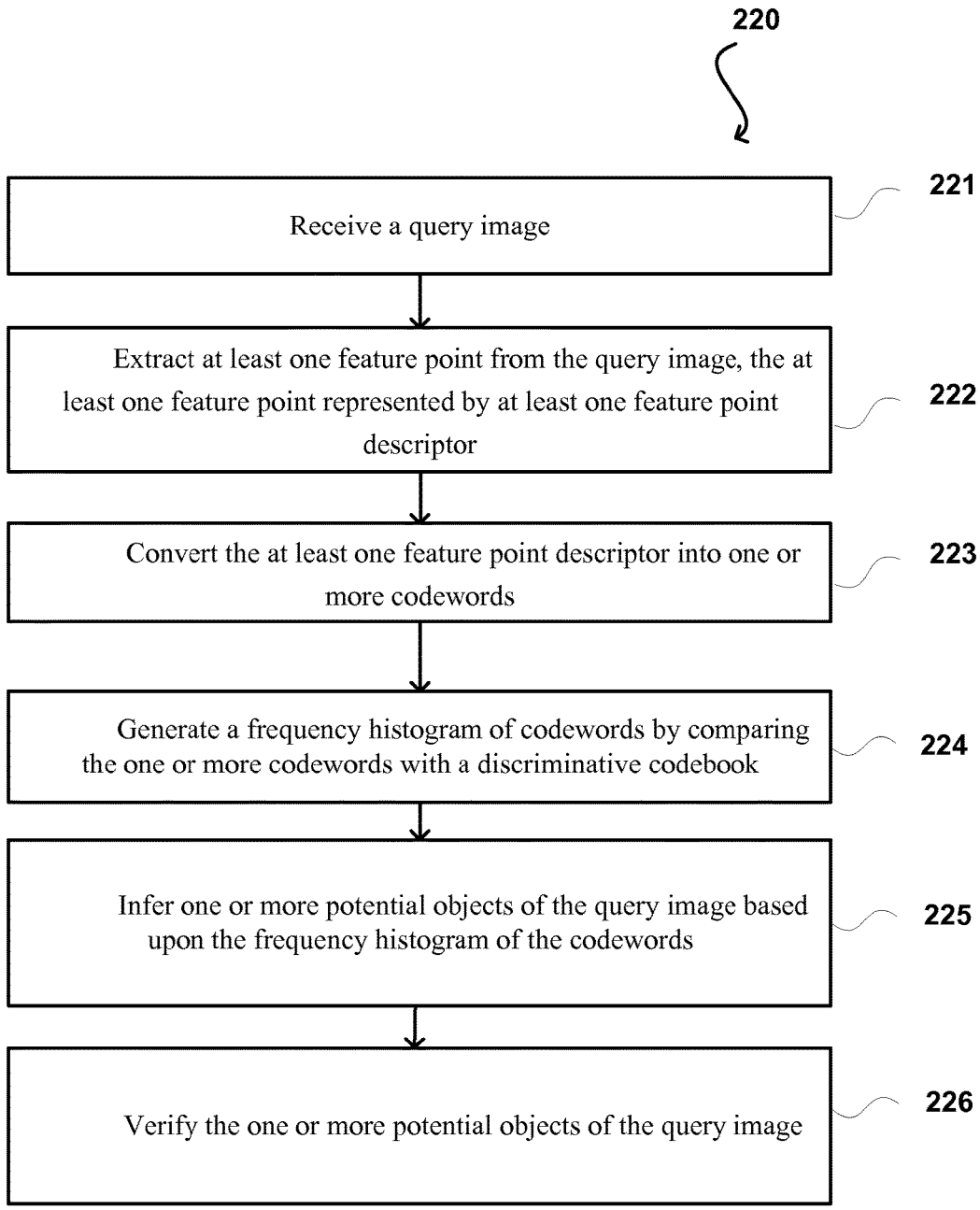
FIG. 2B illustrates an example process for detecting and recognizing one or more potential objects in a query image in accordance with various embodiments.

FIG. 2B illustrates an example process 220 for detecting and recognizing one or more potential objects in a query image in accordance with various embodiments. The example method embodiment 220 starts with receiving a query image, at step 221. At least one feature point can be extracted from the query image, at step 222. Each of the at least one feature point can be represented by one feature point descriptor. Many feature detection techniques can be used to identify the one or more feature points from the query image. The feature detection techniques includes, but is not limited to, maximally stable extremal regions (MSER), image moment, scale-invariant feature transform (SIFT), Hessian-Affine, Harris-Affine, edge-based region (EBR), or scale-invariant shape features (SISF) etc.

At step 223, the at least one feature point descriptor can be converted into one or more codewords. At step 224, a frequency histogram of codewords can be generated by comparing the one or more feature point descriptors of the query image with a discriminative codebook. In some embodiments, the discriminative codebook is represented by a forest of trees with leaves representing codeword bins. At step 225, one or more potential objects (e.g., a list of potential logos) of the query image may be inferred based upon the frequency histogram of the codewords.

In some embodiments, a BoW model can be combined with other techniques (e.g., support vector machine (SVM), Adaboost, and Pyramid match kernel (PMK)) to categorize an image into a determinative codebook. For example, PMK can be used to capture co-occurring features by mapping BoW features or a set of features in high dimension to multi-dimensional multi-resolution histogram. PMK can build multi-resolution histograms by binning data points into discrete regions of increasing size. Therefore, points do not match at high resolution have a chance to match at low resolutions.

In some embodiments, spatial pyramid match (SPM) can be used to capture spatial information between features of an image that provides valuable important in image representations. SPM can perform pyramid matching to partition the image into increasingly find sub-regions and computing histograms of local features inside each sub-region.

At step 226, the one or more potential objects of the query image can be verified. In some embodiments, a set of matching pairs between the query image and a retrieved image from a database can be built based at least upon the one or more potential objects. The set of matching pairs can be used to verify the one or more potential objects. In some embodiments, the set of matching pairs can be refined by using Random Sample Consensus (RANSAC).

Various techniques (e.g., OCR and other geometric recognition processes) may also be used as the primary or secondary image and text analysis technique to verify the one or more potential objects of the query image. Some techniques are described in co-pending U.S. patent application Ser. No. 13/929,689, filed Jun. 27, 2013, entitled "METHOD AND SYSTEM FOR AUTOMATICALLY ANALYZING AN OCR FRAME FOR PRODUCT SEARCH," co-pending U.S. patent application Ser. No. 13/688,772, filed Nov. 29, 2012, entitled "HIGH PERFORMANCE OCR SOLUTION FOR AUGMENTED REALITY APPLICATIONS," and co-pending U.S. patent application Ser. No. 13/842,433, filed Mar. 15, 2013, entitled "SEMI-STRUCTURED TEXT ENTITY RECOGNITION FROM NATURAL SCENE IMAGES," which are hereby incorporated herein by references in their entirety.

Figure 3:
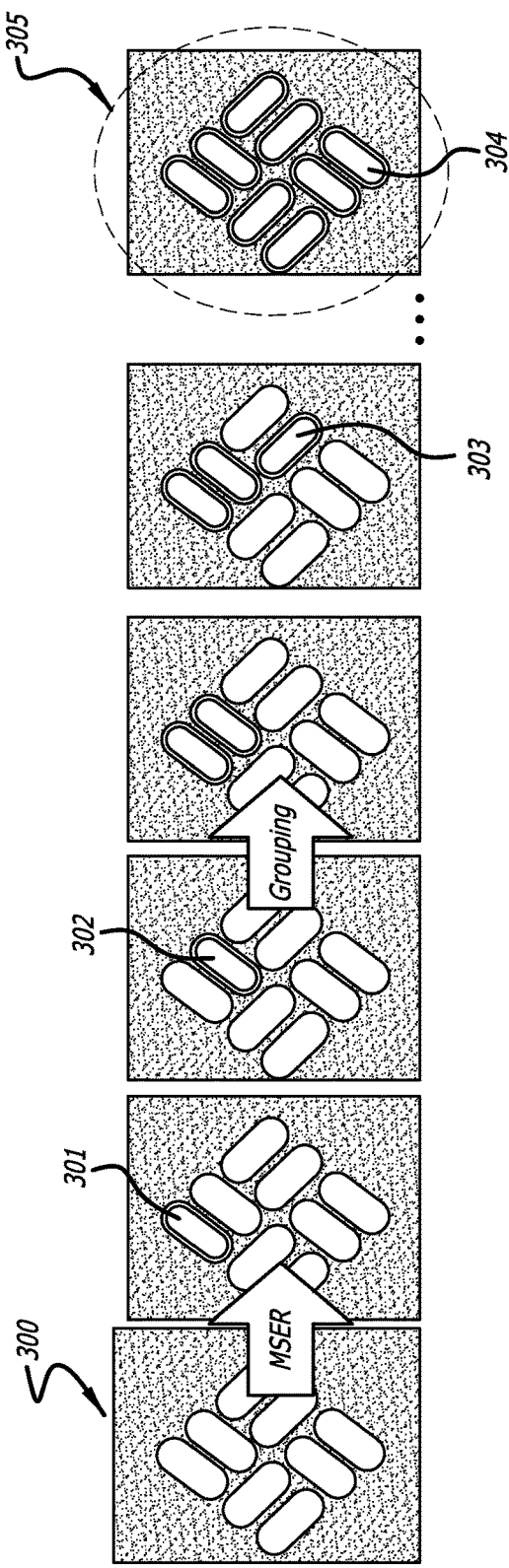
FIG. 3 illustrates an example of a cluster of regions related to an object of an image in accordance with various embodiments.

FIG. 3 illustrates an example of a cluster of regions related to an object of an image 300 in accordance with various embodiments. In this example, the image 300 includes a plurality of segments (e.g., 301, 302, 303 etc.) that are related to a particular object. In some embodiments, an object of an image may occupy disconnected segments of the image. Disconnected segments related to an object can be clustered into a cluster region. For example, assuming the segments 301 and 302 are within a predetermined distance, these two segments can be grouped together. The segment 303 is close to the segment 302 and can also be grouped into the segments 301 and 302. The same process can be repeated until a cluster of segments 305 is formed.

In some embodiments, a cluster of segments may include different levels of segments. Original segments (i.e., 301 and 302) can be at level 1. Segments (e.g., 303 and 304) that are added to the cluster of segments at different stages in the process can be assigned to different levels of the cluster of segments.

Various imaging techniques (e.g., MSER, Harris-Affine, Hessian-Affine, Edge-based, Intensity Extrema, and Salient) can be used to extract segments related to an object from an image, and cluster the extracted segments into a cluster region. In some embodiments, MSER techniques are used to define an image into a set of MSER segments and group related MSER segments into a cluster region. The boundary of the cluster region can be a set of adjacent pixels.

Figure 4:
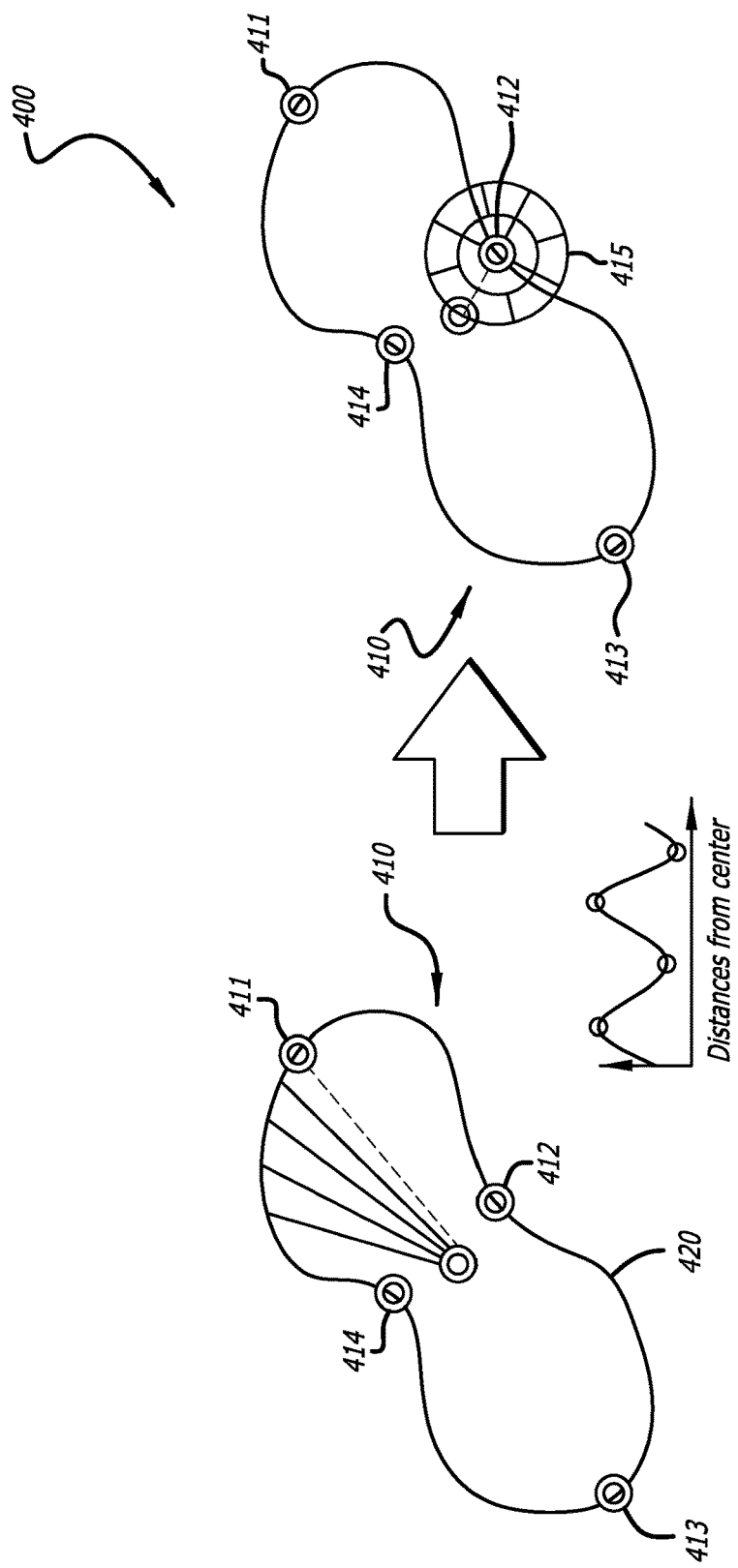
FIG. 4 illustrates an example of feature points extracted from a contour curvature of a region in accordance with various embodiments.

FIG. 4 illustrates an example of feature points extracted from a contour curvature of a region in accordance with various embodiments. In this example, an image 400 includes at least one object 410 lack of texture. A cluster of regions that are related to the at least one object 410 can be extracted by using MSER techniques. In some embodiments, the first and second order moments of a contour of the cluster of regions can be extracted to normalize the cluster regions. A center of the contour 420 of the cluster of regions can be determined. A sequence of distances from the center of the contour 420 can be calculated for each point in the contour. The calculations can be performed in either clockwise or counter-clockwise. A set of extrema points (e.g., 411, 412, 413 and 414) on the sequence of distances can be extracted from the contour and treated as feature points of the image 400. This feature point extraction process can be invariant to geometric transformation of objects of an image and changing in illumination.

In some embodiments, each feature point (e.g., 411, 412, 413 and 414) can be represented by a log-polar shape context descriptor (e.g., 415). An orientation of the descriptor can be computed using the direction from the corresponding feature point to the center of contour 420.

Figure 5:
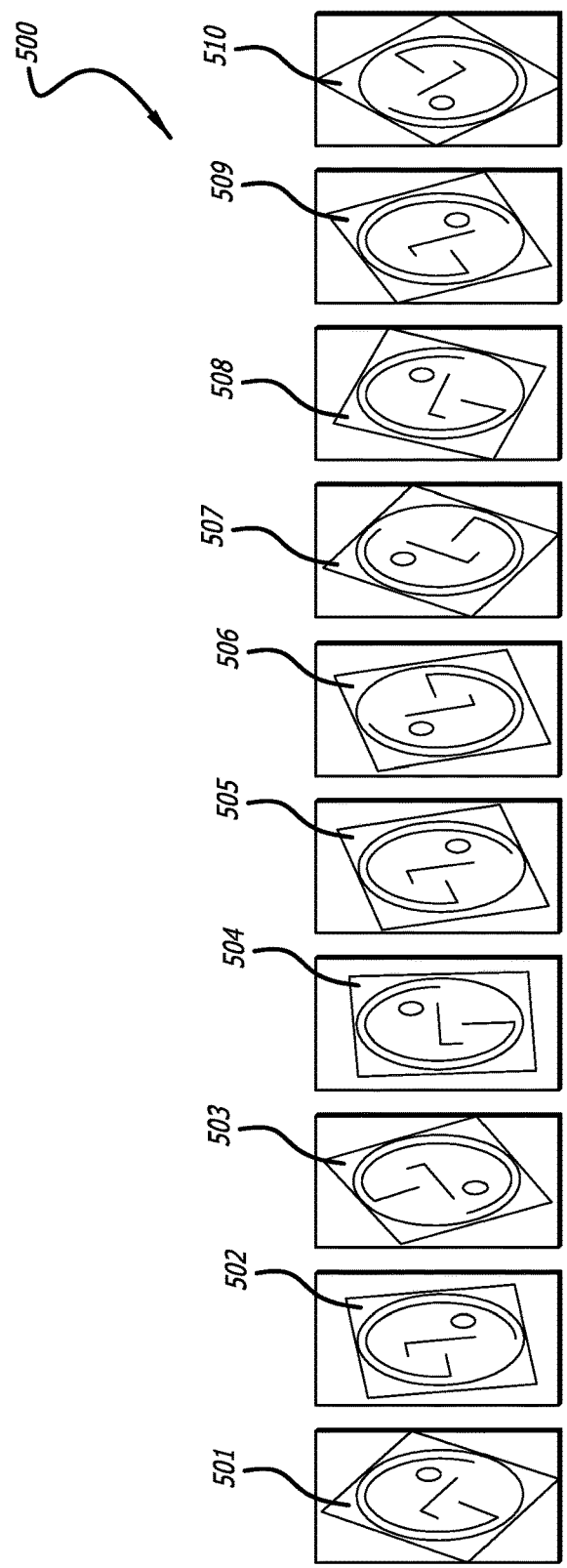
FIG. 5 illustrates an example of different appearances of an object in accordance with various embodiments.

FIG. 5 illustrates an example of different appearances of an object 500 in accordance with various embodiments. In this example, different appearances of the object 500 (such as the depicted trademarked logo for LG Electronics®) include the object 500 in different orientations (e.g., 501, 502, 503, 504, 505, 506, 507, 508, 509 and 510). In some implementations, different appearances of the object 500 may also include, but not limited to, the object 500 in different shapes, sizes, or illuminations. In some embodiments, different appearances of the object 500 can be generated by deforming the object 500 using random perspective transformations. In some embodiments, different appearances of the object 400 can be retrieved from a database of objects.

In some embodiments, different appearances of the object 500 can be used to build up a codeword database. The different appearances of the object 500 can be generated by using random perspective transformations. The codewords that represent different appearances of the object 500 can be computed based at least upon at least one feature point of the object 500, at least one feature point descriptor representing the at least one feature point, or coordinates of the at least one feature point. In some embodiments, each codeword stored in a database can be assigned with a particular weight that is computed according to uniqueness of the corresponding codeword comparing with other codewords in the database.

In some embodiments, a set of points can be randomly selected from a contour of a known shape and another set of points can be selected from a contour of an unknown shape. A shape context can be calculated for each point of the known and unknown shapes. Each point of the known shape can be matched to a pint on the unknown shape. In some implementations, a transformation (e.g., affine, thin plate spline) of an object can be obtained by warping edges of a contour of a cluster of regions related the know shape to align the warped known shape to the unknown shape. Points on the contour of the unknown shape, which correspond to corresponding warped points on the contour of the warped known shape, can be selected. A shape distance between each pair of points on the known and unknown shapes can be calculated. In some embodiments, calculations of a shape distance may also take into account at least one of a weighted sum of shape distances, an image appearance distance, or a bending energy (i.e., a measure of how much transformation required to align a known shape and an unknown shape). The shape distance can be used to identify a new unknown shape.

Figure 6:
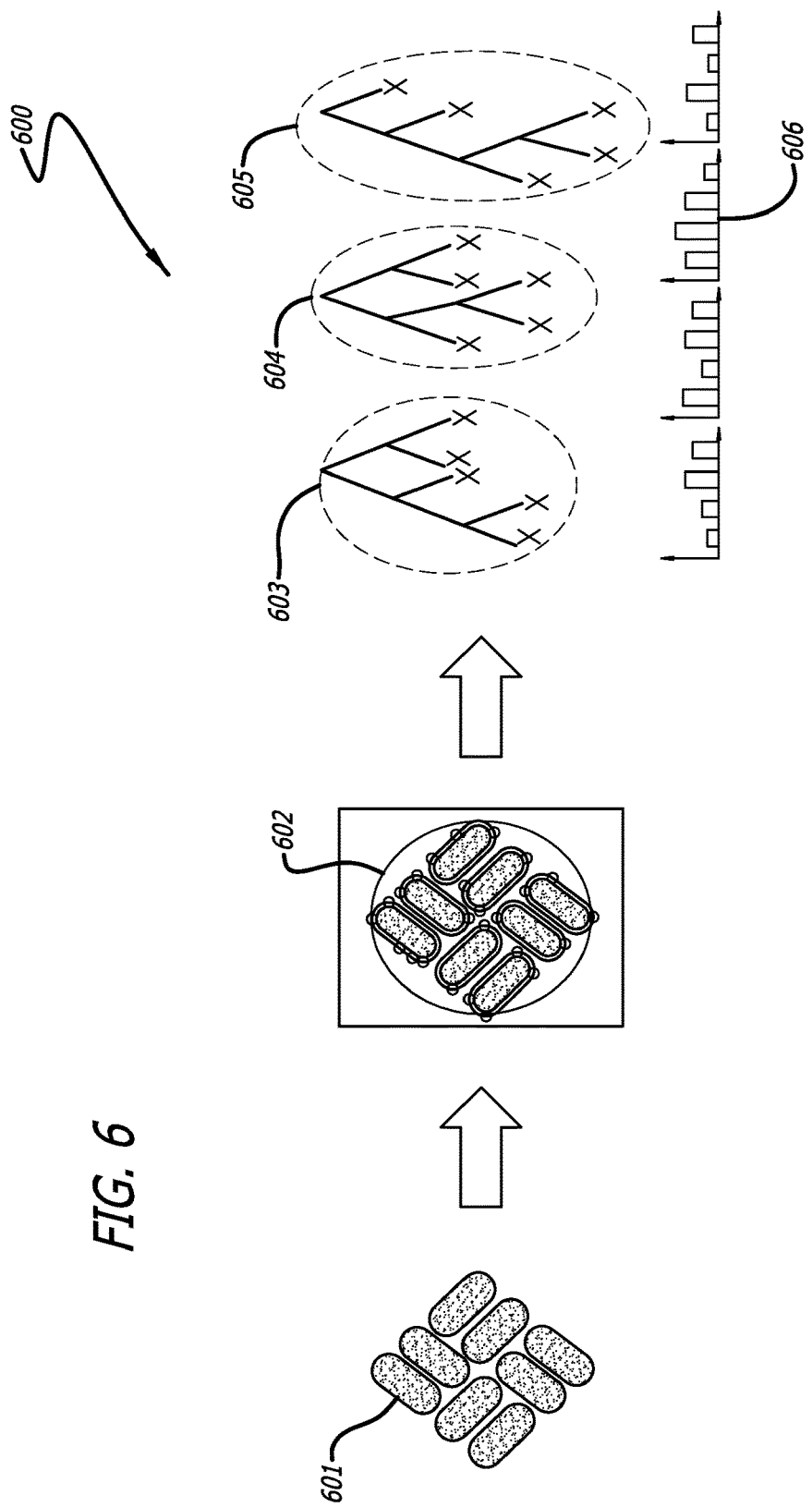
FIG. 6 illustrates an example of discriminative codewords derived from an input image in accordance with various embodiments.

FIG. 6 illustrates an example 600 of discriminative codewords derived from a query image 601 in accordance with various embodiments. In this example, in response to receiving the query image 601, one or more feature points can be detected and identified from the query image 601 according to various feature detection algorithms that include, but are not limited to, maximally stable extremal regions (MSER), image moment, scale-invariant feature transform (SIFT), support vector machine (SVM), Adaboost, and Pyramid match kernel (PMK), Hessian-Affine, Harris-Affine, edge-based region (EBR), or scale-invariant shape features (SISF) etc. Each of the one or more feature points can be represented by one of one or more feature point descriptors 602.

The one or more feature point descriptors can then be converted to one or more codewords. A frequency histogram of codewords can be generated by comparing the one or more codewords with a discriminative codebook that includes a plurality of codewords. Leaves (e.g., 603, 604 and 605) of the discriminative codebook tree can be used to determine corresponding codewords of the one or more feature point descriptor 602. Some embodiments can utilize frequency histograms 606 of these corresponding discriminative codewords to determine one or more potential objects in the query image 601.

Figure 7A:
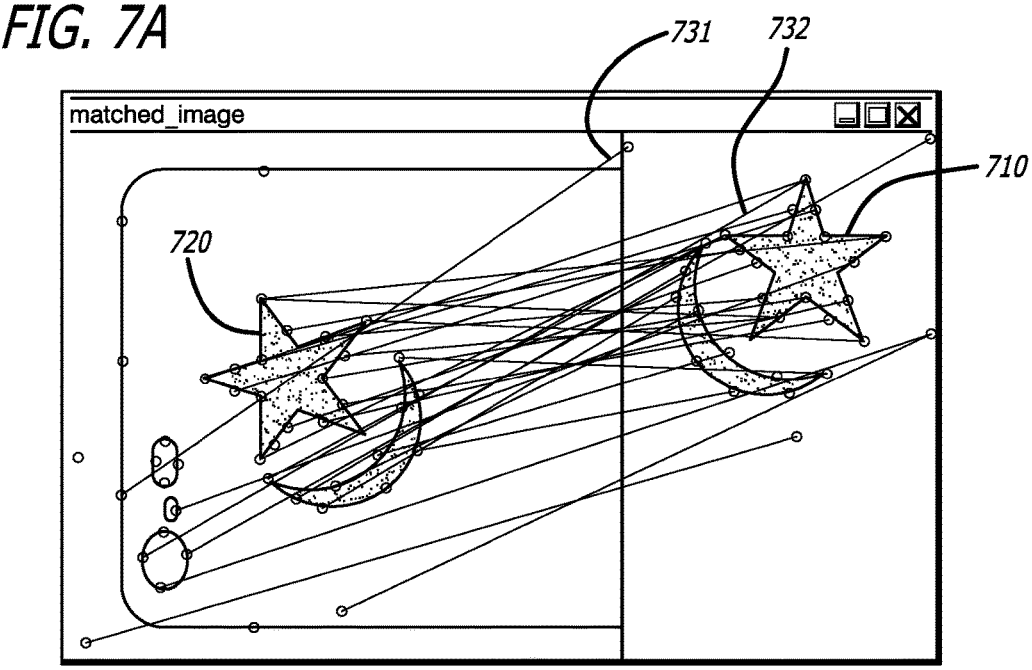
FIG. 7A illustrates an example of matching pairs between a query image and a retrieved image in accordance with various embodiments.

FIG. 7A illustrates an example of matching pairs between a query image 720 and a known image 710 (i.e., an Apple logo) in accordance with various embodiments. In this example, a plurality of match points (e.g., 731 and 732) can be determined by comparing the query image 720 and the known image 710 that is retrieved from a database. The plurality of match points can be used to very one or more potential objects in the query image 720.

Figure 7B:
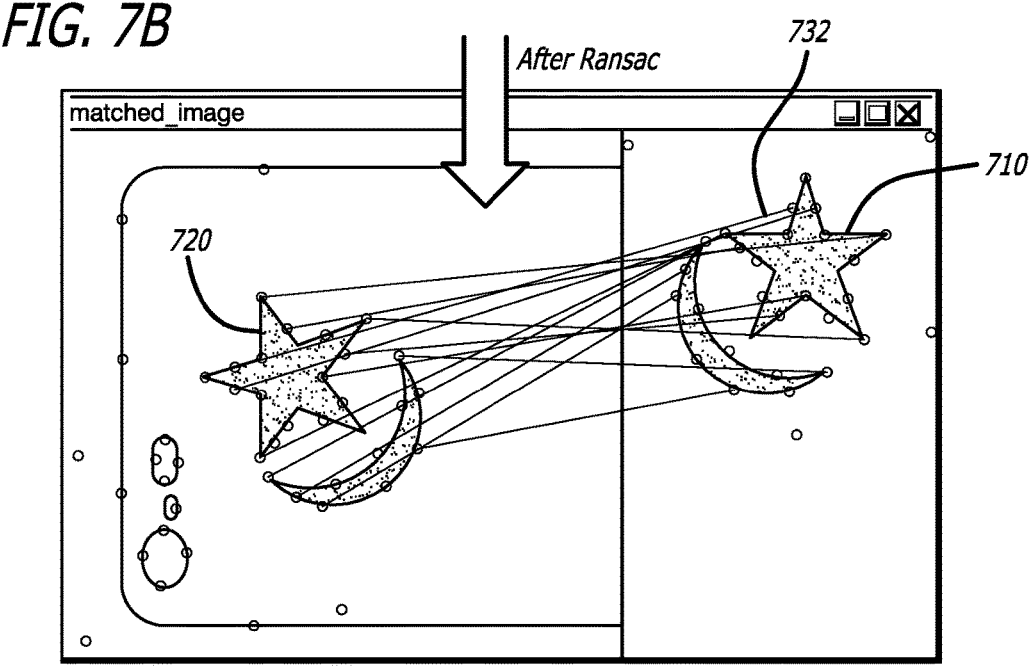
FIG. 7B illustrates an example of matching pairs between a query image and a retrieved image refined by using Random Sample Consensus (RANSAC) in accordance with various embodiments.

Various embodiments provide an iterative technique to refine the plurality of match points between the query image 720 and the known image 710. FIG. 7B illustrates an example of matching pairs between the query image 720 and the known image 710 refined by using Random Sample Consensus (RANSAC) in accordance with various embodiments. In this example, a Random Sample Consensus (RANSAC) is used to refine the plurality of match points with a reasonable degree of accuracy even when there is a large number of outlier are present.

In some embodiments, some other algorithms (e.g., Hough transform and PEARL) may also be used. The Hough transform can be used to verify the plurality of match points when more than one matching model was used. The PEARL algorithm can be used to combine modeling sampling from matching points as in RANSAC with iterative re-estimation of inliners and multi-model fitting being formulated.

Figure 8:
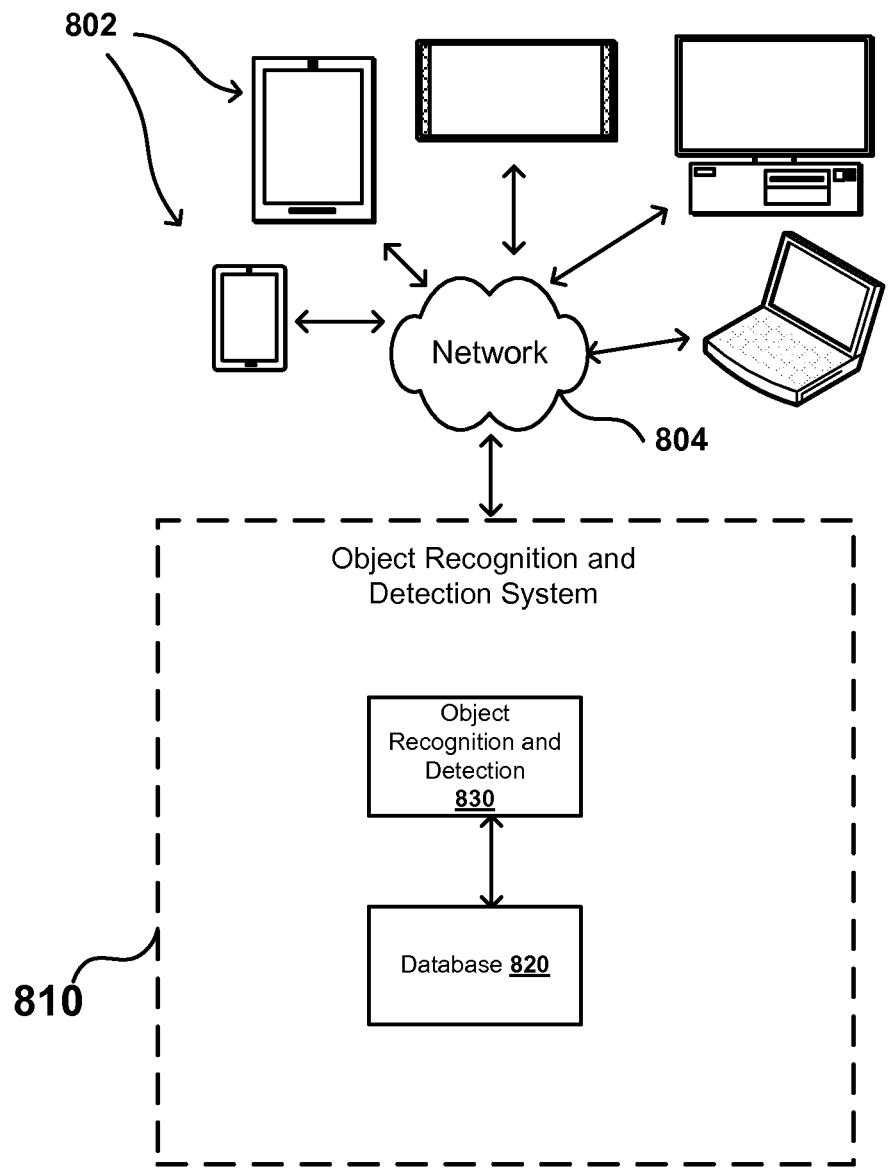
FIG. 8 illustrates an example of an object detection and recognition system for detecting and recognizing objects and/or features in an image in accordance with various embodiments.

FIG. 8 illustrates an example of an object detection and recognition system 810 for detecting and recognizing objects and/or features in an image in accordance with various embodiments. The object detection and recognition system 810 communicates with the client computing devices 802 via the network 804. Although only a few types of the client device are shown in FIG. 8, it should be understood that various types of electronic or computing device that capable of capturing, receiving and/or processing images in accordance with various embodiments discussed herein.

The object detection and recognition system 810 may include an object recognition and detection module 830 and a database 820. The object recognition and detection module 830 can be operable to detect and recognize objects lack of textures and the database 820 is configured to store a plurality of codewords, each of which can be computed based at least upon a feature point, a descriptor associated with the feature point, or a coordinate associated with the feature point. In some embodiments, object recognitions and detections can be performed at least partially on the client computing devices 802.

Figures 9A, 9B:
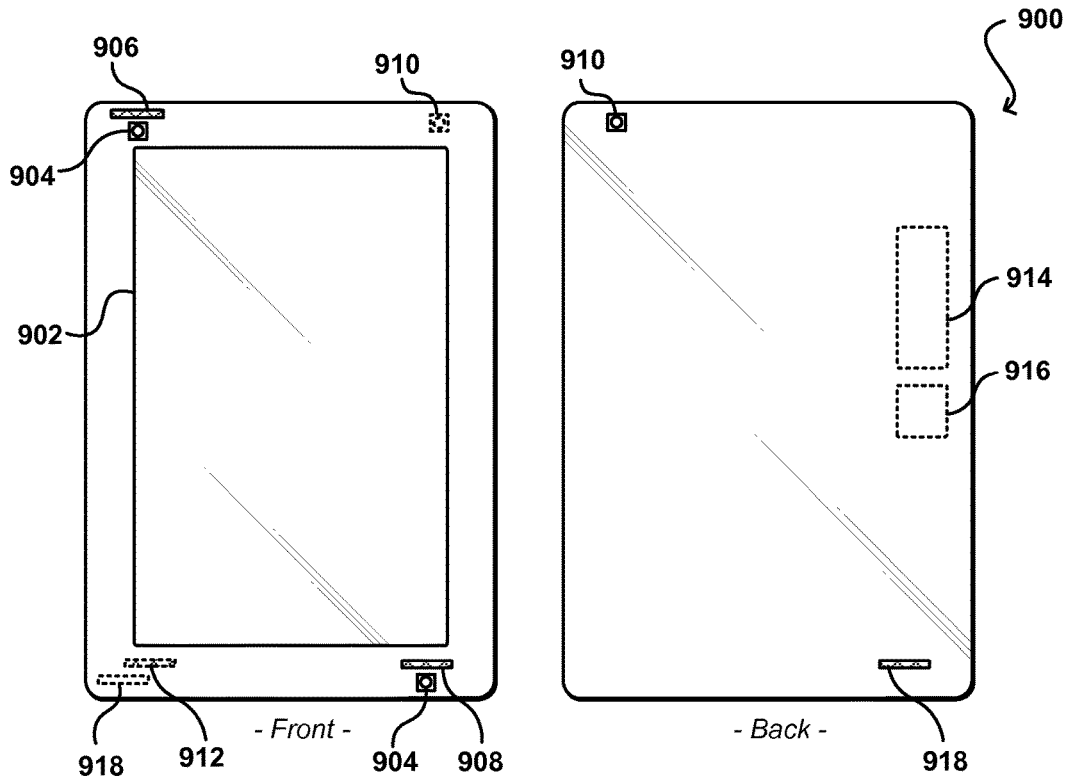
FIGS. 9A and 9B illustrate an example computing device that can be used to implement aspects of the various embodiments.

FIGS. 9A and 9B illustrate front and back views, respectively, of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 900 has a display screen 902 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one computing mechanism 914, such as may include at least one wired or wireless component operable to communicate with one or more electronic devices. The device also includes a power system 916, such as may include a battery operable to be recharged through al plug-in approaches, or through other approaches such as capacitive charging through proximity with a power mat or other such device. Various other elements and/or combinations are possible as well within the scope of various embodiments.

Figure 10:
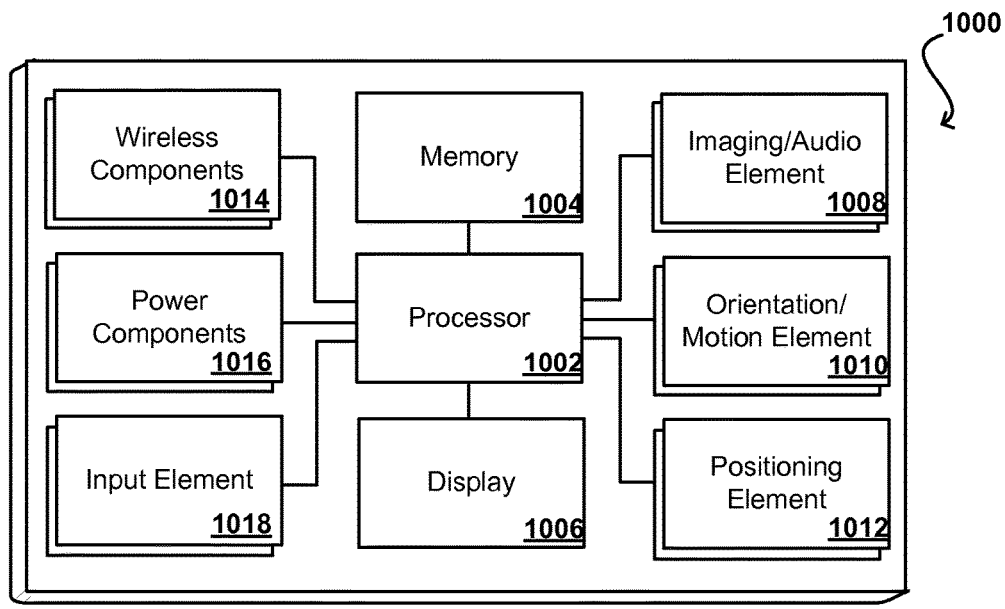
FIG. 10 illustrates example components of a computing device such as that illustrated in FIG. 9, in accordance with various embodiments.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of computing approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers. The display element 1006 is capable of displaying streaming media files or other information to viewers facing the display element 1006.

As discussed, the device in many embodiments will include at least one imaging/audio element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation/motion determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 1000 may also include a low power, low resolution imaging element to capture image data. The low resolution imaging element can transmit the captured image data over a low bandwidth bus, such as an I2C bus, to a low power processor, such as a PIC-class processor. The PIC processor may also communicate with other components of the computing device 1000, such as Orientation Motion Element 1010, etc. The PIC processor can analyze the image data from the low resolution imaging element and other components of the computing device 1000 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 1014 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 1016, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 1018 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 11:
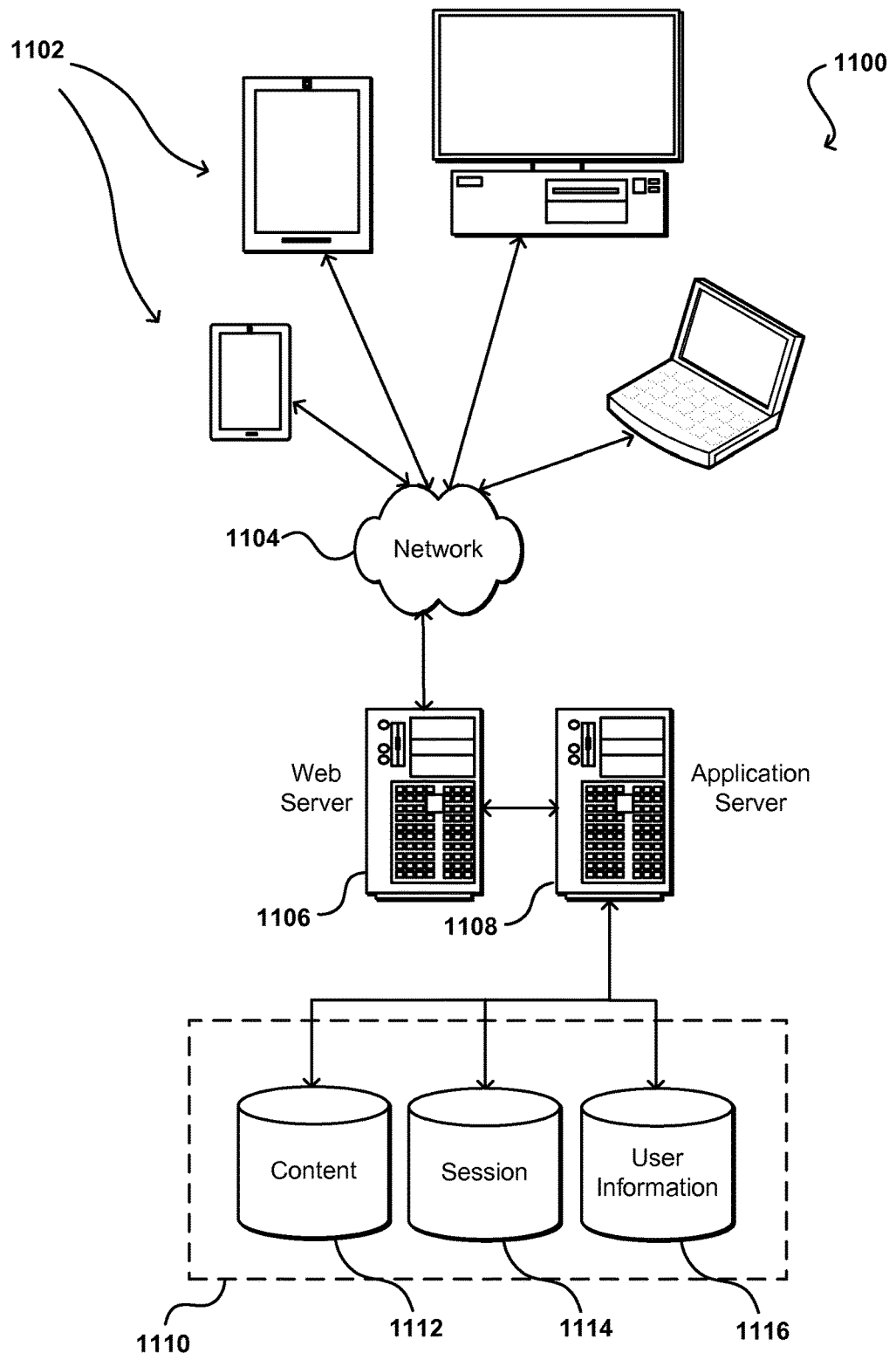
FIG. 11 illustrates an environment in which various embodiments can be implemented in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic computing device 1102, which can include any appropriate device operable to send and receive requests, messages or information over an appropriate network 1104 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the computing device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The user information 1116 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory including instructions that, when executed by the at least one processor, cause the system to:
detect a plurality of segments of an image, each of the plurality of segments corresponding to a specific object represented in the image, the specific object including a plurality of disconnected components, wherein the specific object is a proprietary symbol, and wherein each of the plurality of disconnected components of the proprietary symbol corresponds to a different subset of segments from the plurality of segments;
combine two or more segments of the plurality of segments into a cluster region, the two or more segments corresponding to at least a portion of the proprietary symbol represented in the image;
extract at least one feature point based upon a contour curvature of the cluster region, each of the at least one feature point represented by one feature point descriptor;
convert at least one feature point descriptor into one or more codewords, the at least one feature point descriptor representing the at least one feature point, the one or more codewords representing a particular appearance of the proprietary symbol; and
generate a discriminative codebook based at least upon the one or more codewords, the discriminative codebook including the one or more codewords and at least one additional codeword representing another appearance of the proprietary symbol, the another appearance being different from the particular appearance.

2. The system of claim 1, wherein the instructions when executed further cause the system to:
receive a query image;
extract one or more feature points from the query image, each of the one or more feature points represented by one point descriptor;
convert one or more feature point descriptors into one or more codewords, the one or more feature point descriptor representing the one or more feature points;
generate a frequency histogram of codewords by comparing the one or more codewords with the discriminative codebook;
determine one or more potential objects in the query image based upon the frequency histogram of the codewords; and
verify the one or more potential objects in the query image.

3. The system of claim 2, wherein the instructions when executed further cause the system to:
generate a set of matching pairs between the query image and a retrieved imaged that is retrieved from the database based upon the one or more potential objects; and
verify the set of matching pairs based up the set of matching pairs.

4. The system of claim 3, wherein the instructions when executed further cause the system to:
refine the set of matching pairs by using Random Sample Consensus (RANSAC).

5. A computer-implemented method, comprising:
detecting a plurality of segments of an image, each of the plurality of segments corresponding to a proprietary symbol of the image, the proprietary symbol including a plurality of disconnected components and wherein each of the disconnected components of the proprietary symbol corresponds to a different subset of segments from the plurality of segments;
extracting at least one feature point from the plurality of segments, each of the at least one feature point represented by one feature point descriptor;
converting at least one feature point descriptor into one or more codewords, the at least one feature point descriptor representing the at least one feature point; and
generating a discriminative codebook based at least upon the one or more codewords.

6. The computer-implemented method of claim 5, wherein the at least one feature point is extracted from a contour curvature of the plurality of segments by using at least one of a plurality of feature detection techniques including maximally stable extremal regions (MSER), image moment, scale-invariant feature transform (SIFT), support vector machine (SVM), Adaboost, and Pyramid match kernel (PMK), Hessian-Affine, Harris-Affine, edge-based region (EBR), and scale-invariant shape features (SISF).

7. The computer-implemented method of claim 5, further comprising:
combining the plurality of segments into a cluster region; and
extracting the at least one feature point based upon a contour curvature of the cluster region.

8. The computer-implemented method of claim 7, wherein the cluster region includes two or more segments being within a predetermined distance with each other.

9. The computer-implemented method of claim 8, further comprising:
normalizing the predetermined distance based upon a size of the image.

10. The computer-implemented method of claim 7, further comprising:
determining a center of the contour curvature by averaging locations of all points on the contour curvature;
determining a signature for each point on the contour curvature by calculating a distance between the corresponding point to the center of the contour curvature;
determining one or more extremes, each of the extremes being a signature of points on the contour curvature; and
extracting the at least one feature point according to the one or more extremes.

11. The computer-implemented method of claim 10, further comprising:
determining an orientation for each of the at least one feature point descriptor based upon a direction from a corresponding feature point to the center of contour curvature.

12. The computer-implemented method of claim 5, wherein the at least one feature point descriptor is represented by at least one Log-polar shaping context descriptor.

13. The computer-implemented method of claim 5, wherein the at least one feature point descriptor is represented by at least one gray-scale window, a vector of filter outputs, or brightness at a single pixel.

14. The computer-implemented method of claim 5, wherein the one or more codewords represent a particular appearance of the proprietary symbol, and the one or more codewords are stored in a database that includes at least one codeword converted from corresponding feature point descriptors that represent another appearance of the proprietary symbol, the another appearance being different from the particular appearance.

15. The computer-implemented method of claim 14, further comprising:
generating a set of different appearances of the proprietary symbol by using random perspective transformations;
computing the at least one codeword based at least upon the at least one feature point, the corresponding feature point descriptors, or coordinates of the at least one feature point; and
generating the discriminative codebook based at least upon information stored in the database.

16. The computer-implemented method of claim 5, further comprising:
assigning a particular weight to each codeword stored in the database based upon uniqueness of the corresponding codeword comparing with other codewords in the database.

17. A non-transitory computer-readable storage medium including instructions that, when executed by at least one processor of a computing system, cause the computing system to:
detect plurality of segments of an image, each of the plurality of segments corresponding to a proprietary symbol of the image, the proprietary symbol including a plurality of disconnected components and wherein each of the disconnected components of the proprietary symbol corresponding to a different subset of segments from the plurality of segments;
extract at least one feature point based upon a contour curvature of one of the plurality of segments, each of the at least one feature point represented by one feature point descriptor;
convert at least one feature point descriptor into one or more codewords, the at least one feature point descriptor representing the at least one feature point; and
generate a discriminative codebook based at least upon the one or more codewords.

18. The non-transitory computer-readable storage medium of claim 17, wherein the instructions when executed further cause the system to:
receive a query image;
extract one or more feature points from the query image, each of the one or more feature points represented by one point descriptor;
convert one or more feature point descriptors into one or more codewords, the one or more feature point descriptor representing the one or more feature points;
generate a frequency histogram of codewords by comparing the one or more codewords with the discriminative codebook;
infer one or more potential objects in the query image based upon the frequency histogram of the codewords; and
verify the one or more potential objects in the query image.

19. The non-transitory computer-readable storage medium of claim 18, wherein the instructions when executed further cause the system to:
generate a set of matching pairs between the query image and a retrieved imaged that is retrieved from the database based upon the one or more potential objects; and
determine the set of matching pairs based up the set of matching pairs.

20. The non-transitory computer-readable storage medium of claim 19, wherein the instructions when executed further cause the system to:
refine the set of matching pairs by using Random Sample Consensus (RANSAC).

* * * * *